US012606313B2

(12) United States Patent
Alecu

(10) Patent No.: US 12,606,313 B2
(45) Date of Patent: Apr. 21, 2026

(54) AIRCRAFT POWERPLANT(S) FOR AN AIRCRAFT WITH ELECTRIC MACHINE CONTROLLED PROPULSOR SPEED

(71) Applicant: Pratt & Whitney Canada Corp., Longueuil (CA)

(72) Inventor: Daniel Alecu, Brampton (CA)

(73) Assignee: Pratt & Whitney Canada Corp., Longueuil (CA)

( * ) Notice: Subject to any disclaimer, the term of this patent is extended or adjusted under 35 U.S.C. 154(b) by 239 days.

(21) Appl. No.: 17/707,334

(22) Filed: Mar. 29, 2022

(65) Prior Publication Data

US 2023/0312115 A1      Oct. 5, 2023

(51) Int. Cl.
| | |
|---|---|
| B64D 27/33 | (2024.01) |
| B64D 27/10 | (2006.01) |
| B64D 27/31 | (2024.01) |
| B64D 31/18 | (2024.01) |
| B64D 35/025 | (2024.01) |
| B64D 27/02 | (2006.01) |

(52) U.S. Cl.
CPC ............. B64D 27/10 (2013.01); B64D 27/31 (2024.01); B64D 27/33 (2024.01); B64D 31/18 (2024.01); B64D 35/025 (2024.01); B64D 27/026 (2024.01)

(58) Field of Classification Search
None
See application file for complete search history.

(56) References Cited

U.S. PATENT DOCUMENTS

| | | | | |
|---|---|---|---|---|
| 2,763,986 | A * | 9/1956 | Block | B64D 31/00 |
| | | | | 137/80 |
| 6,986,641 | B1 * | 1/2006 | Desai | G05B 5/01 |
| | | | | 60/791 |
| 10,906,656 | B2 | 2/2021 | Gilliland | |
| 2018/0118364 | A1 | 5/2018 | Golshany | |
| 2018/0354635 | A1 * | 12/2018 | Wagner | B64D 27/24 |
| 2019/0023408 | A1 * | 1/2019 | Murrow | B64D 27/357 |
| 2020/0062414 | A1 * | 2/2020 | Hon | B64D 31/10 |
| 2020/0148372 | A1 * | 5/2020 | Long | B64D 31/18 |
| 2021/0025338 | A1 * | 1/2021 | Des Roches-Dionne | |
| | | | | B64D 31/06 |
| 2021/0094694 | A1 | 4/2021 | Seminel | |
| 2021/0108575 | A1 | 4/2021 | Sridhar | |
| 2022/0009615 | A1 | 1/2022 | Mark | |
| 2022/0063792 | A1 * | 3/2022 | Freely | B64D 35/023 |

OTHER PUBLICATIONS

EP search report for EP23165248.8 dated Aug. 10, 2023.

* cited by examiner

*Primary Examiner* — Phutthiwat Wongwian
*Assistant Examiner* — Jacek Lisowski
(74) *Attorney, Agent, or Firm* — Getz Balich LLC

(57) ABSTRACT
A system is provided for an aircraft. This aircraft system includes a propulsor, a powerplant and a control system. The powerplant is configured to output mechanical power to drive rotation of the propulsor. The powerplant includes a heat engine and an electric machine. The heat engine is configured to provide a first portion of the mechanical power. The electric machine is configured to provide a second portion of the mechanical power. The control system is configured to operate the powerplant to control a rotational speed of the propulsor by adjusting the second portion of the mechanical power.

14 Claims, 10 Drawing Sheets

AIRCRAFT POWERPLANT(S) FOR AN AIRCRAFT WITH ELECTRIC MACHINE CONTROLLED PROPULSOR SPEED

TECHNICAL FIELD

This disclosure relates generally to an aircraft and, more particularly, to hybrid powerplants and methods for controlling the hybrid powerplants.

BACKGROUND INFORMATION

A control system for a conventional turboprop engine for an aircraft may control propeller speed by adjusting propeller blade pitch. For example, the control system may signal a pitch control system to adjust the propeller blade pitch to drive the propeller speed to or maintain the propeller speed at a desired reference speed. While such a control system and turboprop engine configuration have various benefits, there is still room in the art for improvement.

SUMMARY

According to an aspect of the present disclosure, a system is provided for an aircraft. This aircraft system includes a propulsor, a powerplant and a control system. The powerplant is configured to output mechanical power to drive rotation of the propulsor. The powerplant includes a heat engine and an electric machine. The heat engine is configured to provide a first portion of the mechanical power. The electric machine is configured to provide a second portion of the mechanical power. The control system is configured to operate the powerplant to control a rotational speed of the propulsor by adjusting the second portion of the mechanical power.

According to another aspect of the present disclosure, another system is provided for an aircraft. This aircraft system includes a first propulsion system, a second propulsion system and a control system. The first propulsion system includes a first propulsor. The second propulsion system includes a second propulsor. The control system is configured to operate the first propulsion system and the second propulsion system based on: a differential phase parameter between the first propulsor and the second propulsor; a differential speed parameter between the first propulsor and the second propulsor; and/or an average speed parameter between the first propulsor and the second propulsor.

According to still another aspect of the present disclosure, a method is provided for operating an aircraft system. During this method, a propulsor is rotated to generate thrust. The propulsor is rotated using mechanical power provided concurrently from a heat engine and an electric machine. The electric machine is operated to control a rotational speed of the propulsor.

The method may also include a step of controlling a pitch of a plurality of blades independent of the rotational speed of the propulsor. The propulsor may include the blades.

The first propulsion system may also include a first powerplant configured to drive rotation of the first propulsor. The first powerplant may include a first heat engine and a first electric machine. The control system may be configured to operate the first powerplant to control a rotational speed of the first propulsor by regulating electrical power provided to the first electric machine.

The second propulsion system may also include a second powerplant configured to drive rotation of the second propulsor. The second powerplant may include a second heat engine and a second electric machine. The control system may be configured to operate the second powerplant to control a rotational speed of the second propulsor by regulating electrical power provided to the second electric machine.

The second portion of the mechanical power may be less than thirty percent of the mechanical power.

The second portion of the mechanical power may be adjusted to drive the rotational speed of the propulsor towards a setpoint.

The second portion of the mechanical power may be adjusted to maintain the rotational speed of the propulsor within a range.

The control system may be configured to: determine a rotational speed parameter indicative of a rotational speed of the electric machine; and signal the powerplant to adjust electrical power provided to the electric machine based on the rotational speed parameter.

The control system may be configured to operate the powerplant to control a torque of the heat engine.

The control system may be configured to: determine a torque parameter indicative of a torque output by the heat engine; and signal the powerplant to adjust fuel provided to the heat engine based on the torque parameter.

The propulsor may include a plurality of variable pitch propulsor blades. A pitch of the variable pitch propulsor blades may be adjusted independent of the rotational speed of the propulsor.

The propulsor may include a plurality of variable pitch propulsor blades. A pitch of the variable pitch propulsor blades may be adjusted based on at least one of: an indicated airspeed of the aircraft; a true airspeed of the aircraft; a Mach number of the aircraft; a thrust request; or a phase of aircraft flight.

The aircraft system may also include a first propulsion system and a second propulsion system. The first propulsion system may include the propulsor and the powerplant. The second propulsion system may include a second propulsor. The control system may be configured to operate the powerplant to control the rotational speed of the propulsor based on a differential phase parameter associated with the propulsor and the second propulsor.

The aircraft system may also include a first propulsion system and a second propulsion system. The first propulsion system may include the propulsor and the powerplant. The second propulsion system may include a second propulsor. The control system may be configured to operate the powerplant to control the rotational speed of the propulsor based on a differential speed parameter between the propulsor and the second propulsor.

The aircraft system may also include a first propulsion system and a second propulsion system. The first propulsion system may include the propulsor and the powerplant. The second propulsion system may include a second propulsor. The control system may be configured to operate the powerplant to control the rotational speed of the propulsor based on an average speed parameter between the propulsor and the second propulsor.

The aircraft system may also include a first propulsion system and a second propulsion system. The first propulsion system may include the propulsor and the powerplant. The control system may be configured to adjust thrust produced by the first propulsion system and thrust produced by the second propulsion system to control a flight parameter of the aircraft.

The control system may include a torsional mode notch filter.

The propulsor may be configured as or otherwise include a propeller.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
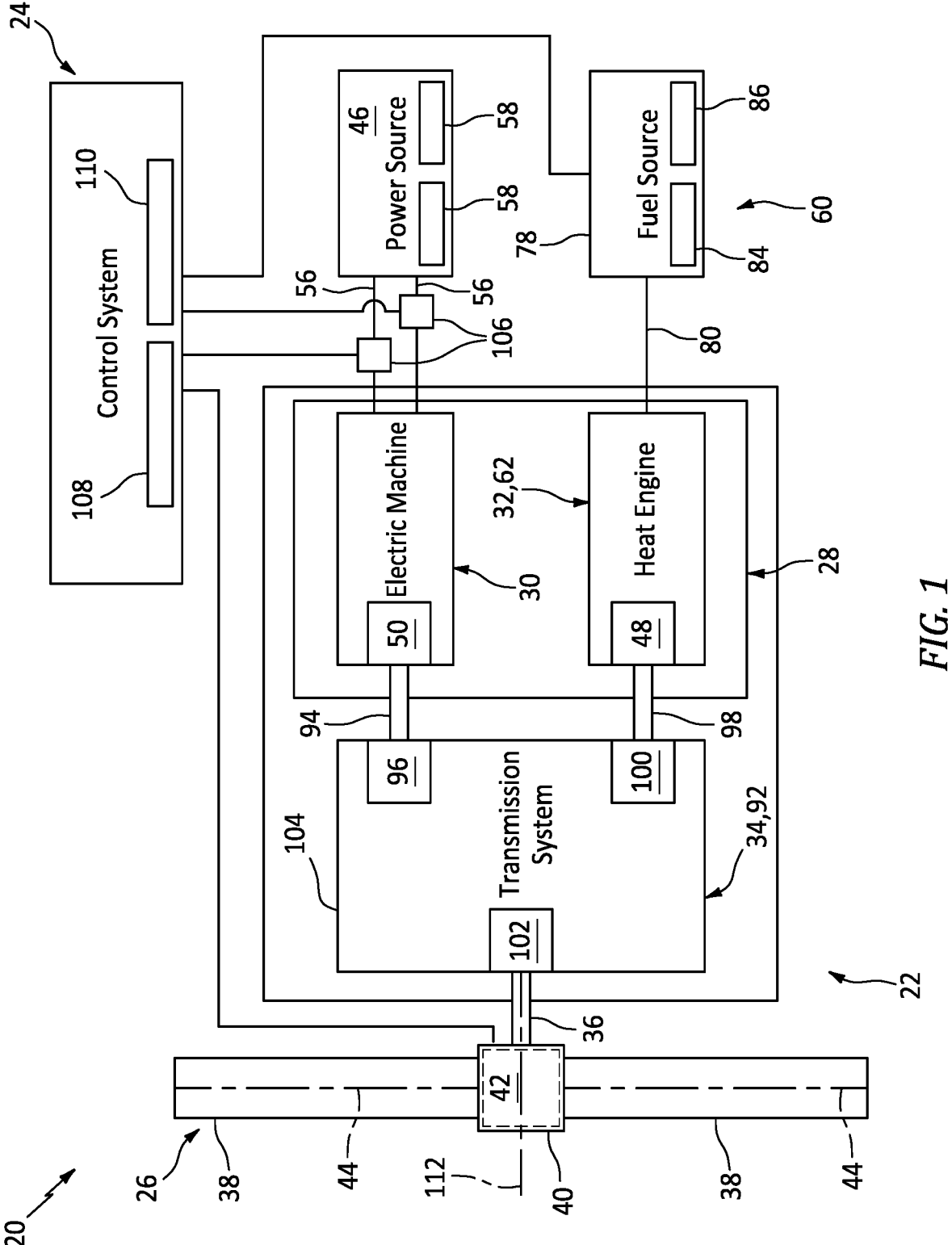
FIG. 1 is a schematic illustration of a hybrid propulsion system for an aircraft.
Figure 6:
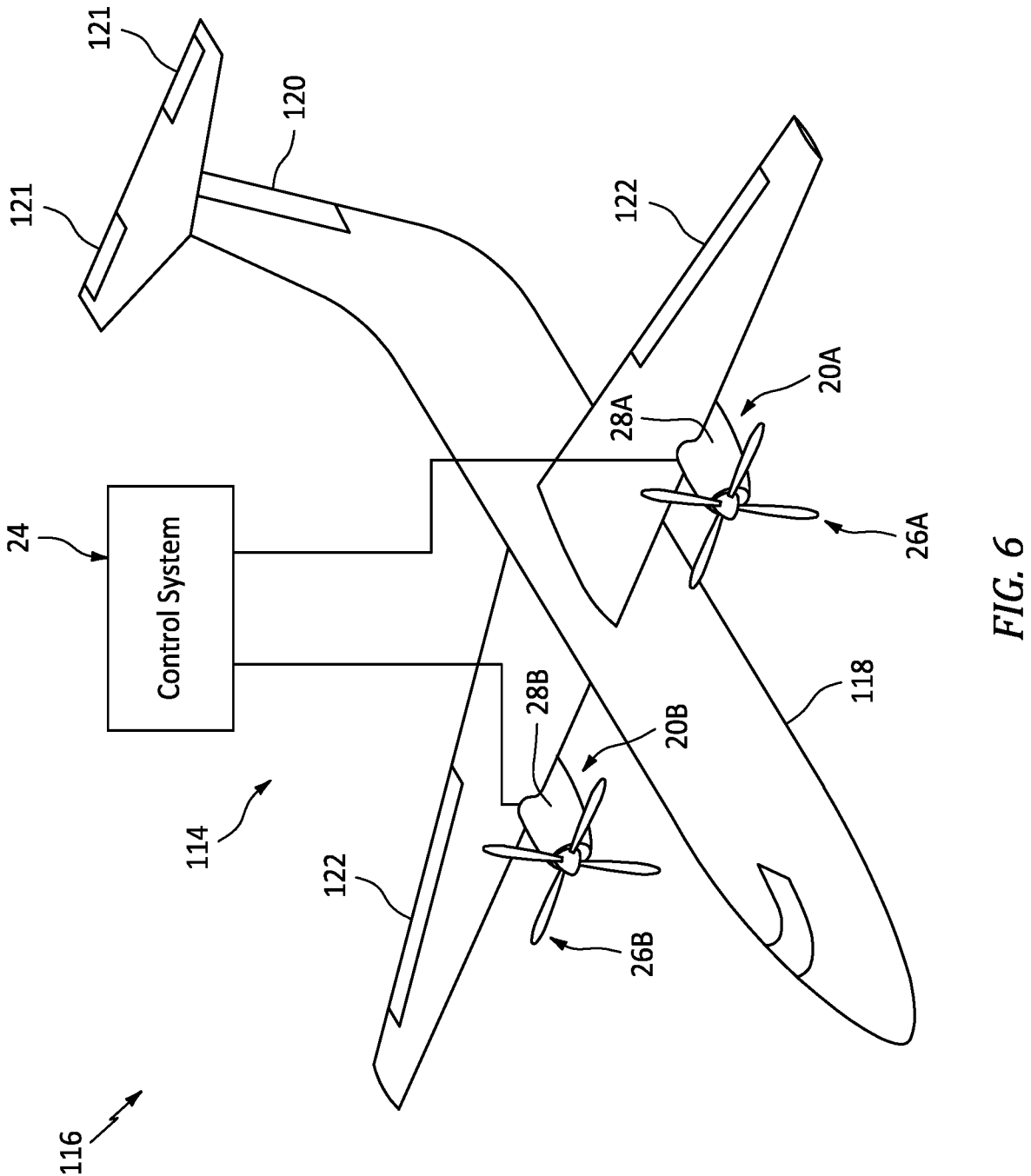
FIG. 6 is a schematic illustration of an aircraft with multiple hybrid propulsion systems.

FIG. 1 is a schematic illustration of a hybrid propulsion system 20 for an aircraft; e.g., see aircraft 116 in FIG. 6. This aircraft propulsion system 20 includes a powertrain 22 and a control system 24. The powertrain 22 includes a propulsor 26 and a hybrid powerplant 28, which hybrid powerplant 28 includes an electric machine 30 and a heat engine 32. The powertrain 22 of FIG. 1 also includes a power transmission system 34 for transmitting mechanical power from the hybrid powerplant 28 to the propulsor 26.

The propulsor 26 is a bladed rotor mechanically driven by an output shaft 36 or another torque transmission device. This propulsor 26 may be configured as a propeller for a propeller engine; e.g., a hybrid turboprop engine. The present disclosure, however, is not limited to such an exemplary propulsor. The propulsor 26, for example, may alternatively be configured as a fan for a ducted fan engine (e.g., a hybrid turbofan engine) or a rotor (e.g., a main rotor) for a helicopter engine (e.g., a hybrid turboshaft engine). However, for ease of description, the propulsor 26 may be described or referred to herein as the propeller.

The propulsor 26 may be configured as a variable pitch propulsor; e.g., a variable pitch propeller. The propulsor 26 of FIG. 1, for example, includes a plurality of variable pitch propulsor blades 38 arranged circumferentially about a hub 40. Each of the propulsor blades 38 is connected to and projects radially out from the hub 40. The propulsor blades 38 are motively coupled/operatively connected to a pitch adjustment system 42. This pitch adjustment system 42 is configured to adjust (e.g., change) pitch of the propulsor blades 38. The pitch adjustment system 42, for example, may concurrently move (e.g., pivot) each of the propulsor blades 38 about a spanwise (e.g., pivot) axis 44 of that respective propulsor blade 38.

The electric machine 30 may be configurable as an electric motor and/or an electric generator. For example, during a motor mode of operation, the electric machine 30 may operate as the electric motor to convert electricity received from a power source 46 into mechanical power. This mechanical power may be utilized for various purposes within the aircraft propulsion system 20 such as, for example, rotating the propulsor 26 and/or rotating a rotating assembly 48 within the heat engine 32 (see also FIG. 3) during heat engine startup. During a generator mode of operation, the electric machine 30 may operate as the electric generator to convert mechanical power received from, for example, the heat engine rotating assembly 48 into electricity. This electricity may be utilized for various purposes within the aircraft propulsion system 20 such as, for example, electrically powering one or more electric components of the aircraft propulsion system 20 and/or charging the power source 46. The electricity may also or alternatively be utilized for various purposes outside of the aircraft propulsion system 20 such as, for example, electrically powering one or more electric components in an aircraft.

Figure 2:
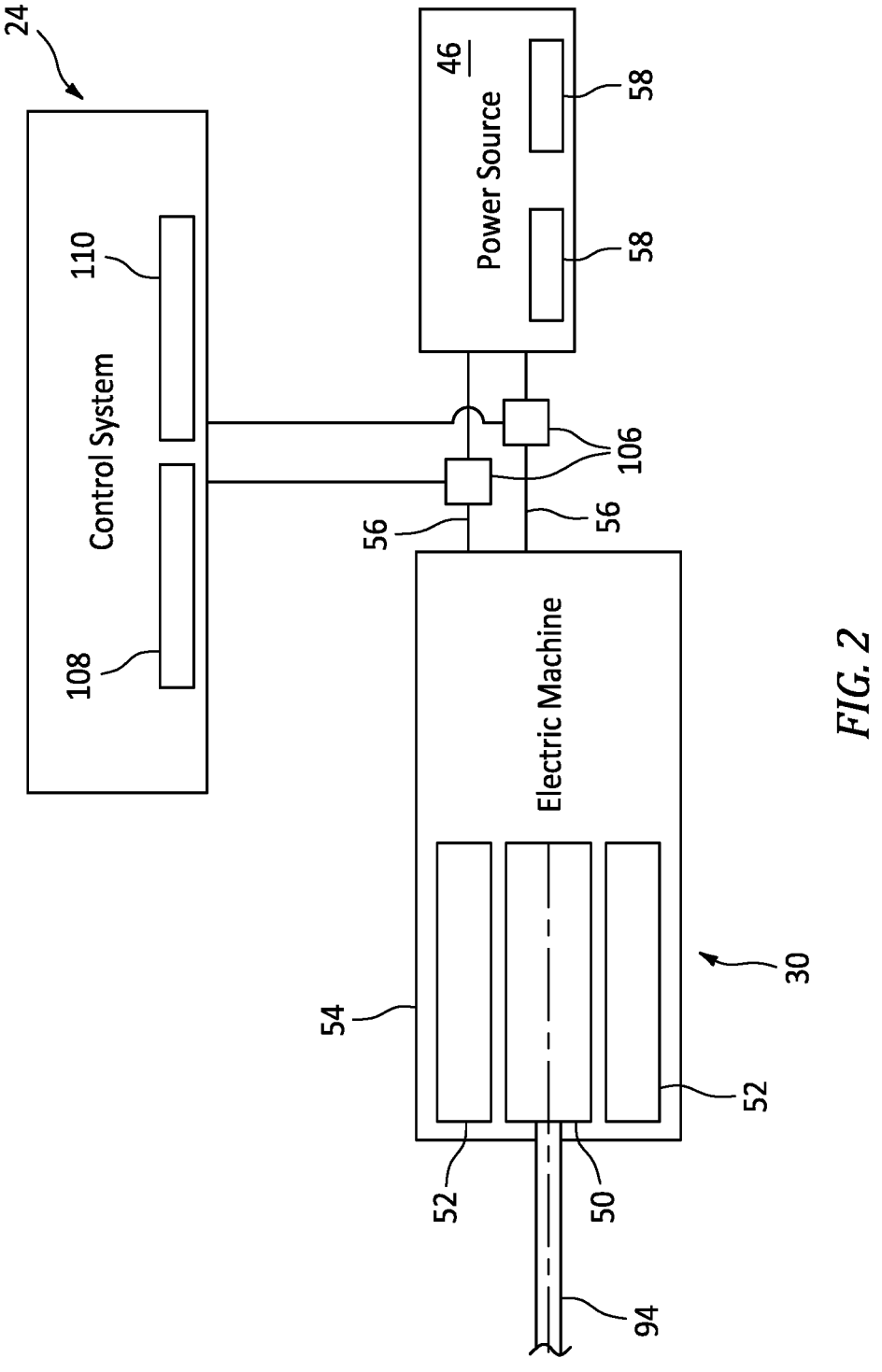
FIG. 2 is a schematic illustration of an electric system with an electric machine for the hybrid propulsion system.

The electric machine 30 of FIG. 2 includes an electric machine rotor 50 and an (e.g., annular) electric machine stator 52, where the machine stator 52 may be radially outboard of and circumscribe the machine rotor 50. The electric machine 30 also includes an electric machine case 54 that at least partially or completely houses the machine rotor 50 and the machine stator 52.

The electric machine 30 is electrically coupled with the power source 46 through one or more electrical leads 56; e.g., high voltage lines. The power source 46 is configured to store electricity. The power source 46 is also configured to provide the stored electricity to the electric machine 30 and/or receive electricity from the electric machine 30; e.g., during recharging. The power source 46, for example, may be configured as or otherwise include one or more batteries 58; e.g., a battery bank.

The heat engine 32 of FIG. 1 is configured to receive fuel from a fuel system 60. The heat engine 32 is configured to convert chemical energy stored within the fuel into mechanical power. The heat engine 32 of FIG. 3, for example, is configured as or may otherwise include a gas turbine engine 62. The present disclosure, however, is not limited to such an exemplary heat engine. The heat engine 32, for example, may alternatively be configured as or otherwise include a reciprocating piston internal combustion (IC) engine or a rotary internal combustion (IC) engine. However, for ease of description, the heat engine 32 may be described or referred to as herein the gas turbine engine 62.

Figure 3:
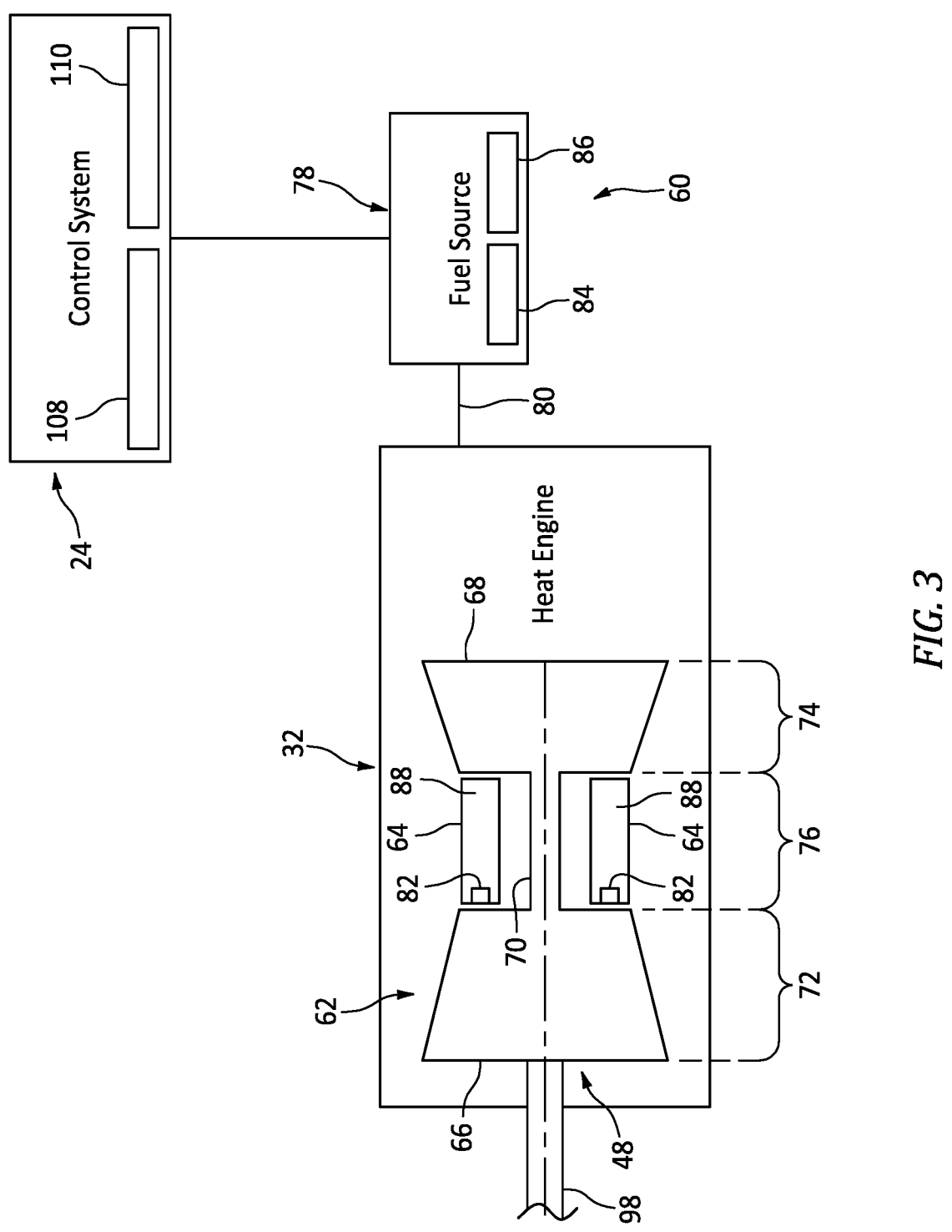
FIG. 3 is a schematic illustration of an engine system with a heat engine for the hybrid propulsion system, where the heat engine may be configured as a gas turbine engine with at least a core spool.

The gas turbine engine 62 of FIG. 3 includes the rotating assembly 48, a combustor 64 and an engine case housing the rotating assembly 48 and the combustor 64. The rotating assembly 48 includes a bladed compressor rotor 66, a bladed turbine rotor 68 and a shaft 70 connecting the compressor rotor 66 to the turbine rotor 68. The compressor rotor 66 is arranged in a compressor section 72 of the gas turbine engine 62. The turbine rotor 68 is arranged within a turbine section 74 of the gas turbine engine 62. The combustor 64 is arranged within a combustor section 76 of the gas turbine engine 62.

The fuel system 60 of FIG. 3 includes a fuel source 78 and at least one fuel line 80. The fuel source 78 is configured to provide the fuel to one or more fuel injectors 82 of the heat engine 32 (the gas turbine engine 62 in FIG. 3) through the fuel line 80. The fuel source 78 is also configured to store (e.g., contain a quantity of) the fuel before, during and/or after heat engine operation. The fuel source 78 of FIG. 3, for example, includes a fuel reservoir 84 and a fuel flow regulator 86. The fuel flow regulator 86 may be or otherwise include a pump and/or a valve. This fuel flow regulator 86 is configured to direct fuel received from the fuel reservoir 84 to the fuel injectors 82 through the fuel line 80.

Figure 4:
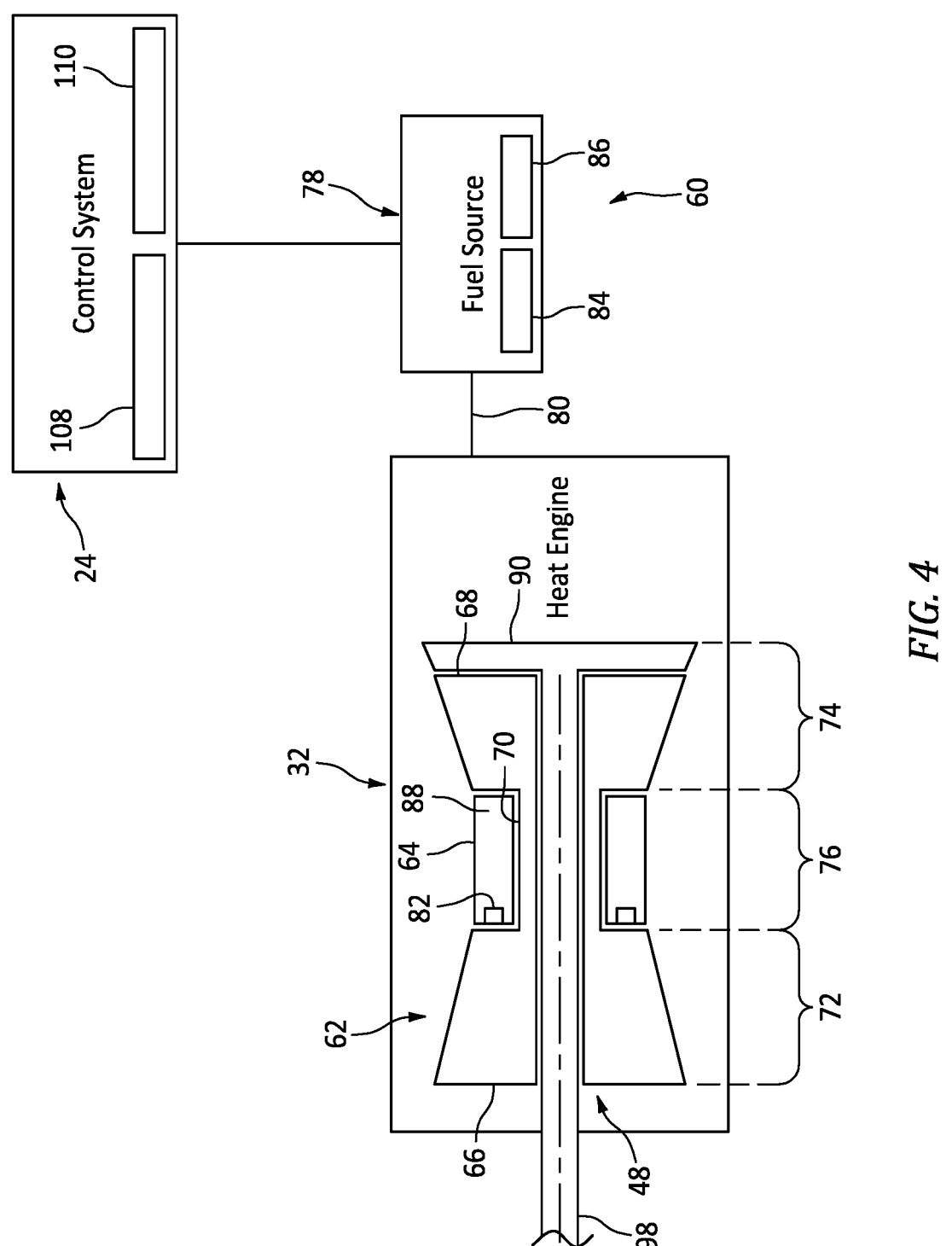
FIG. 4 is a schematic illustration of the engine system, where the heat engine may be configured as a gas turbine engine with at least the core spool and a free turbine.

During operation of the gas turbine engine 62 of FIG. 3, air enters a gas path within the gas turbine engine 62 through an airflow inlet. The gas path extends sequentially through the compressor section 72, the combustor section 76 and the turbine section 74. This air is compressed by the compressor rotor 66 and directed into a combustion chamber 88 88 of the combustor 64. The fuel received from the fuel system 60 is injected into the combustion chamber 88 by the fuel injectors 82 and mixed with the compressed air to provide a fuel-air mixture. This fuel-air mixture is ignited and combustion products thereof flow through and cause the turbine rotor 68 to rotate. The rotation of the turbine rotor 68 drives rotation of the compressor rotor 66 and, thus, compression of the air received from the airflow inlet. The rotation of the rotating assembly 48 also provides mechanical power for driving (e.g., rotating) the propulsor 26 (see FIG. 1). The present disclosure, however, is not limited to such an exemplary gas turbine engine configuration. For example, referring to FIG. 4, the gas turbine engine 62 may also include a free turbine 90 (e.g., a power turbine) that provides the mechanical power for driving the propulsor 26 (see FIG. 1).

The power transmission system 34 of FIG. 1 may be configured as or otherwise include a geartrain 92. This geartrain 92 is configured to motively couple/operatively connect the electric machine 30 and the heat engine 32 to the propulsor 26. An electric machine coupler 94 (e.g., a shaft), for example, rotatably couples the electric machine 30 and its machine rotor 50 (e.g., see also FIG. 2) to a first component 96 of the geartrain 92; e.g., a gear, a carrier, a shaft, etc. A heat engine coupler 98 (e.g., a shaft) rotatably couples the heat engine 32 and its rotating assembly 48 (e.g., see also FIGS. 3 and 4) to a second component 100 of the geartrain 92; e.g., a gear, a carrier, a shaft, etc. The output shaft 36 rotatably couples the propulsor 26 to a third component 102 of the geartrain 92; e.g., a gear, a carrier, a shaft, etc. These geartrain components 96, 100 and 102 are arranged together within a geartrain case 104 such that mechanical power may be transmitted through the geartrain 92 and its geartrain components 96, 100 and 102, for example: (1) from the electric machine 30 to the propulsor 26; (2) from the heat engine 32 to the propulsor 26; (3) from the heat engine 32 to the electric machine 30; and/or (4) from the electric machine 30 to the heat engine 32.

The control system 24 is in signal communication with one or more of propulsion system components. The control system 24, for example, may be hardwired and/or wirelessly coupled with one or more electrical power regulators 106 between the power source 46 and the electric machine 30. The control system 24 may be hardwired and/or wirelessly coupled with the fuel source 78 and its fuel flow regulator 86. The control system 24 may be hardwired and/or wirelessly coupled with the pitch adjustment system 42.

The control system 24 may be implemented with a combination of hardware and software. The hardware may include memory 108 and at least one processing device 110, which processing device 110 may include one or more single-core and/or multi-core processors. The hardware may also or alternatively include analog and/or digital circuitry other than that described above.

The memory 108 is configured to store software (e.g., program instructions) for execution by the processing device 110, which software execution may control and/or facilitate performance of one or more operations such as those described in the methods below. The memory 108 may be a non-transitory computer readable medium. For example, the memory 108 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 5A:
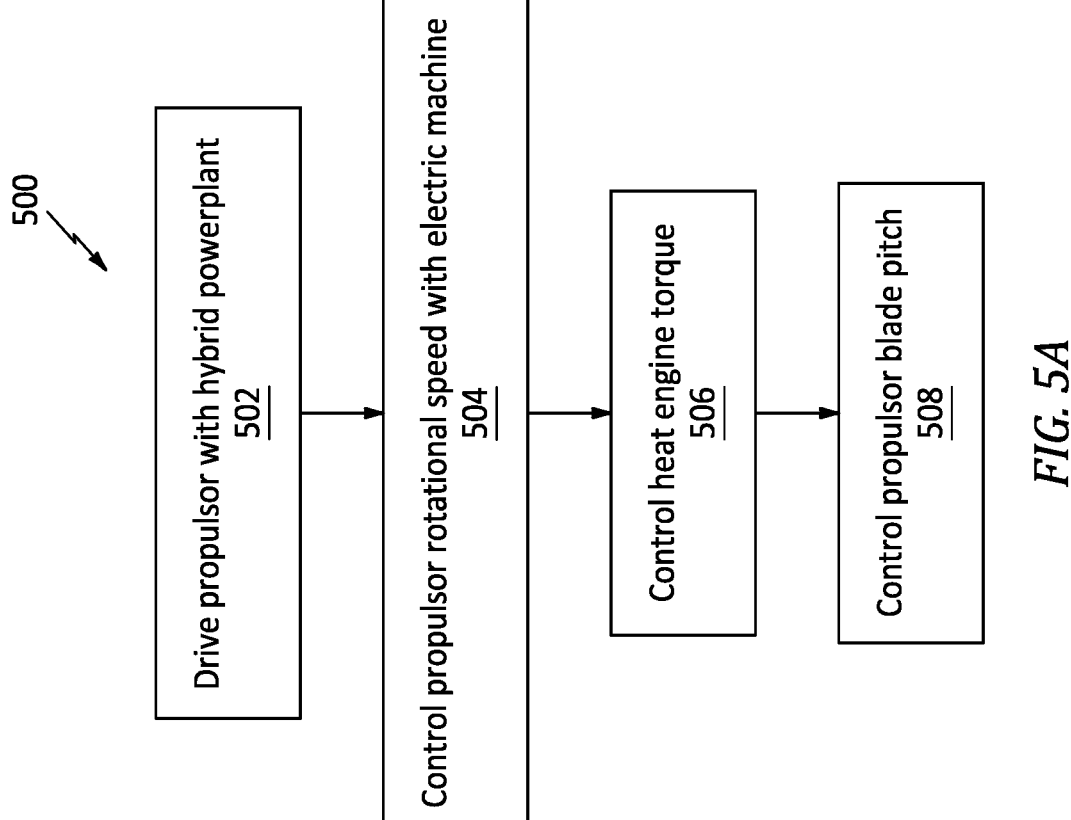
FIG. 5A is a flow diagram of a method for operating a hybrid propulsion system.
Figure 5B:
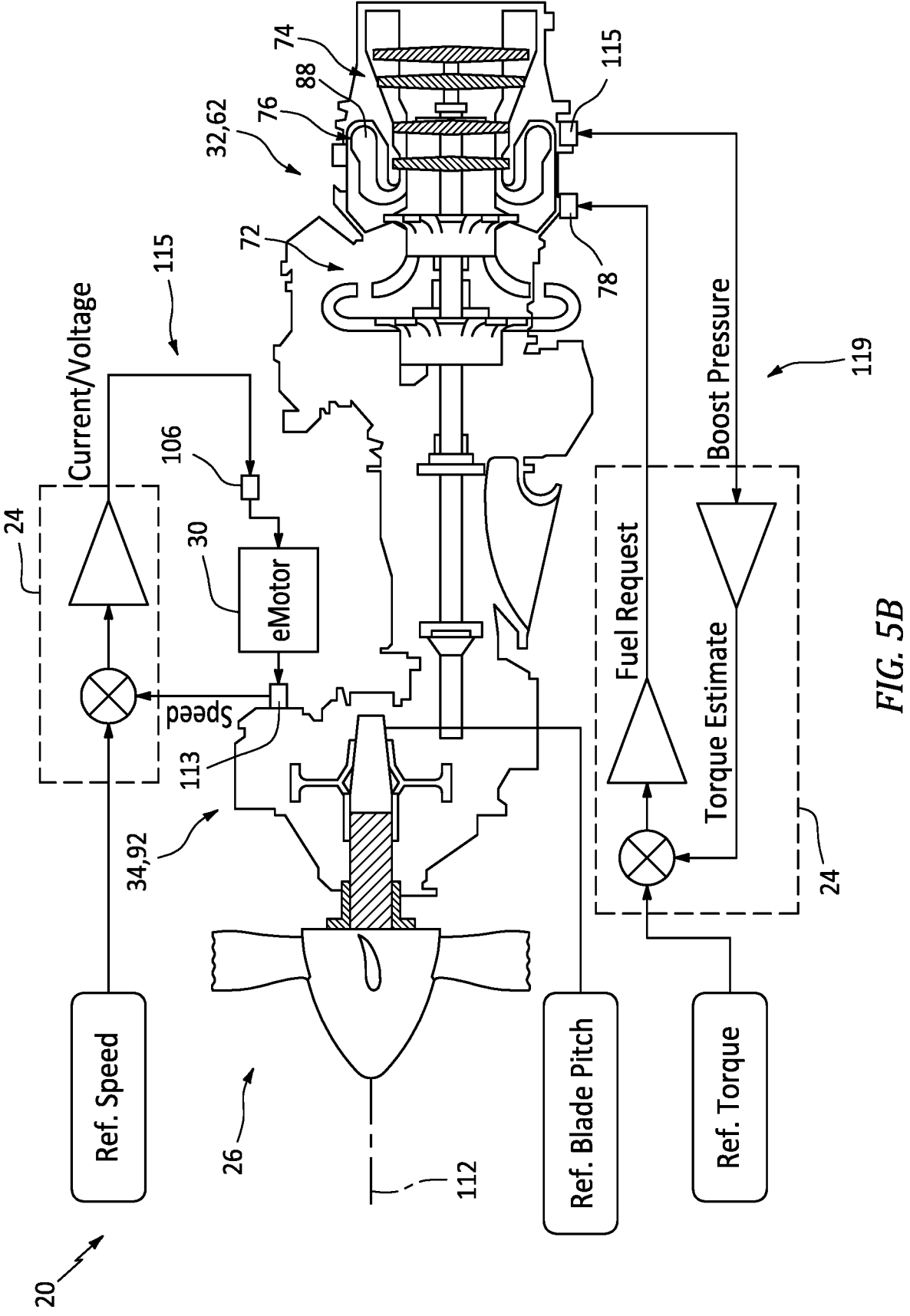
FIG. 5B is a schematic illustration for the operating method in FIG. 5A.

FIG. 5A is a flow diagram of a method 500 for operating an aircraft propulsion system. For ease of description, this operation method 500 is described below with reference to the aircraft propulsion system 20 described herein. The operation method 500 of the present disclosure, however, is not limited to such an exemplary aircraft propulsion system. An embodiment of the operation method 500 is further schematically depicted in FIG. 5B. The present disclosure, however, is not limited to the exemplary feedback parameter detailed in FIG. 5B as described below in further detail.

In step 502, the hybrid powerplant 28 is operated to drive rotation of the propulsor 26 and produce aircraft propulsion system thrust; e.g., aircraft thrust. The electric machine 30, for example, is operated in its motor mode of operation to convert electricity received from the power source 46 into machine mechanical power. The electric machine 30 inputs this machine mechanical power into the power transmission system 34 and its geartrain 92. Concurrently, the heat engine 32 (e.g., the gas turbine engine 62 of FIG. 3 or 4) is operated to convert chemical energy stored in the fuel received from the fuel system 60 into engine mechanical power. The heat engine 32 inputs the engine mechanical power into the power transmission system 34 and its geartrain 92. Within the transmission system 34 and its geartrain 92, the machine mechanical power and the engine mechanical power are combined together to provide powerplant mechanical power; e.g., a total mechanical power provided (e.g., output) by the hybrid powerplant 28. This powerplant mechanical power is transferred from the transmission system 34 and its geartrain 92 to the propulsor 26, where the powerplant mechanical power drives rotation of the propulsor 26 about a rotational axis 112 of the propulsor 26. This rotation of the propulsor 26 in turn generates part or all thrust generated by the aircraft propulsion system 20; e.g., thrust for the aircraft.

During normal hybrid powerplant operation, a majority of the powerplant mechanical power may come from the heat engine 32. The heat engine 32, for example, may provide (e.g., generate) a heat engine portion of the powerplant mechanical power while the electric machine 30 concurrently provides (e.g., generates) an electric machine portion of the powerplant mechanical power, where the heat engine portion is greater than the electric machine portion. The electric machine portion, for example, may account for less than forty percent (40%), thirty percent (30%), twenty percent (20%) or ten percent (10%) of the powerplant mechanical power. The machine mechanical power, for example, may be equal to between five percent (5%) and twenty-five percent (25%) of the powerplant mechanical power. The operation method 500 of the present disclosure, however, is not limited to such exemplary relationships between the machine mechanical power and the engine mechanical power.

The power split between the heat engine 32 and the electric machine 30 may (e.g., ideally) be selected such that the heat engine 32 operates in at or about its maximum efficiency; e.g., between eighty percent (80%) and one-hundred percent (100%) of maximum power for a gas turbine engine. The electric machine 30 is then modulated to provide the remaining power. For example, at aircraft take-off, the heat engine 32 may be operated at or near one-hundred percent (100%) and the electric machine 30 may be operated at or near one-hundred percent (100%). During aircraft climb, the heat engine 32 may be operated at or near one-hundred percent (100%) and the electric machine 30 may be operated at or near fifty percent (50%). During aircraft cruise, the heat engine 32 may be operated at or near one-hundred percent (100%) and the electric machine 30 may be operated between zero percent (0%) and five percent (5%). During aircraft descent, the heat engine 32 may be operated at or near one-hundred percent (100%) and the electric machine 30 may be operated at or about ninety percent (90%) as a generator; e.g., to charge the batteries 58 and/or provide electric power to one or more other systems as discussed above. Where the aircraft include multiple hybrid powerplant 28, these powerplants 28 may be operated alike or different. For example, within a first hybrid powerplant 28, the heat engine 32 may be operated at or near one-hundred percent (100%) and the electric machine 30 may be operated at or about eighty percent (80%) as a generator. Within a second hybrid powerplant 28, the heat engine 32 may be operated at or near zero percent (0%) (e.g., the heat engine is non-operational) and the electric machine 30 may be operated between ten percent (10%) and seventy percent (70%) as a motor that receives electric power from, for example, the electric machine 30 in the first hybrid powerplant 28.

In step 504, the electric machine 30 is operated to control a rotational speed of the propulsor 26 ("propulsor speed"). The electric machine 30, for example, may be operated to drive the propulsor speed to a propulsor speed setpoint; e.g., a reference speed. Alternatively, the electric machine 30 may be operated to maintain the propulsor speed within (or drive the propulsor speed into) a range between a lower (e.g., minimum) threshold and an upper (e.g., maximum) threshold; e.g., a reference speed range. During this step, the propulsor speed may be controlled (e.g., maintained substantially constant) without requiring adjustment of the propulsor blade pitch. By contrast, some legacy control architectures may control propeller speed by changing propeller blade pitch. The operation method 500 of the present disclosure may thereby reduce use of the pitch adjustment system 42 and/or facilitate use of the pitch adjustment system 42 for adjusting, for example, one or more other aircraft propulsion system parameters as discussed below in further detail.

To control the propulsor speed, the control system 24 may receive sensor data from a sensor 113 (see FIG. 5B) (e.g., a once per revolution sensor) arranged with the electric machine 30, the power transmission system 34, the electric machine coupler 94 or the like. The control system 24 may process this sensor data to determine (e.g., calculate, estimate, etc.) a rotational speed parameter indicative of a rotational speed of the machine rotor 50, a rotational speed of the electric machine coupler 94, or the like. The control system 24 may subsequently control operation of the electric machine 30 based on the determined rotational speed parameter. The control system 24, for example, may signal one or more of the electrical power regulators 106 to maintain, reduce or increase electricity provided to the electric machine 30 based on the rotational speed parameter. For example, where the rotational speed parameter is below a machine speed setpoint corresponding to the propulsor speed setpoint (or a lower threshold corresponding to the propulsor speed lower threshold), the control system 24 may signal the electrical power regulators 106 to increase the electricity provided to the electric machine 30 in order to increase the rotational speed of the electric machine 30 ("machine speed") and, thus, increase the propulsor speed. In another example, where the rotational speed parameter is above the machine speed setpoint (or an upper threshold corresponding to the propulsor speed upper threshold), the control system 24 may signal the electrical power regulators 106 to reduce the electricity provided to the electric machine 30 in order to decrease the machine speed and, thus, decrease the propulsor speed. In still another example, where the rotational speed parameter is equal to the machine speed setpoint (or between the lower and upper thresholds), the control system 24 may signal the electrical power regulators 106 to maintain the electricity provided to the electric machine 30 to maintain the machine speed and, thus, maintain the propulsor speed (e.g., constant). The control system 24 may thereby regulate (e.g., maintain, increase, decrease or otherwise adjust) the machine mechanical power to regulate (e.g., maintain, increase, decrease or otherwise adjust) the propulsor speed using a feedback loop 115 with a summer and a functional amplifier. The term "summer" may describe a control element which calculates a control error between a required/reference parameter and an actual (e.g., measured) parameter. The term "functional amplifier" may describe a control element which scales a signal; e.g., for every 1 rpm error, electric power is increased by a predetermined number of watts (e.g., 2 kilowatts).

In step 506, the heat engine 32 is operated to control a torque (or another dynamic parameter such as combustor pressure, etc.) of the heat engine 32. The heat engine 32, for example, may be operated to drive the torque to a torque setpoint; e.g., a reference torque. Alternatively, the heat engine 32 may be operated to maintain the torque within (or drive the torque into) a range between a lower (e.g., minimum) threshold and an upper (e.g., maximum) threshold; e.g., a reference torque range.

To control the torque, the control system 24 may receive sensor data from a sensor 117 (e.g., a pressure sensor) arranged with the gas path of the gas turbine engine 62. The control system 24 may process this sensor data to determine (e.g., calculate, estimate, etc.) a torque parameter for the heat engine 32 indicative of a torque output by or applied to the rotating assembly 48, the heat engine coupler 98, or the like. The control system 24 may subsequently control operation of the heat engine 32 based on the determined torque parameter. The control system 24, for example, may signal the fuel source 78 to maintain, reduce or increase fuel provided to the heat engine 32 based on the torque parameter. For example, where the torque parameter is below the torque setpoint (or the lower threshold), the control system 24 may signal the fuel source 78 to increase the fuel provided to the heat engine 32 in order to increase the torque. In another example, where the torque parameter is above the torque setpoint (or the upper threshold), the control system 24 may signal the fuel source 78 to reduce the fuel provided to the heat engine 32 in order to decrease the torque. In still another example, where the torque parameter is equal to the torque setpoint (or between the lower and upper thresholds), the control system 24 may signal the fuel source 78 to maintain the fuel provided to the heat engine 32 to maintain the torque (e.g., constant). The control system 24 may thereby regulate (e.g., maintain, increase, decrease or otherwise adjust) the heat engine torque using a feedback loop 119 with a summer and one or more functional amplifiers.

In step 508, the pitch of the propulsor blades 38 is controlled. The control system 24, for example, may provide a command signal to the pitch adjustment system 42 based on one or more of the following parameters: an indicated airspeed of the aircraft; a true airspeed of the aircraft; a Mach number of the aircraft; a thrust request from the cockpit (e.g., a pilot thrust command); and/or a phase of the aircraft (e.g., taxi, takeoff, climb, cruise, decline, landing, etc.). One or more of these parameters may be determined using one or more sensors and/or using one or more computer models. The command signal may be provided to adjust the propulsor blade pitch to a position that provides, for example, a (e.g., optimal) compromise between at least some or all of the foregoing parameters. The propulsor blade pitch may thereby be controlled (e.g., adjusted) independent of propulsor speed.

Controlling the propulsor blade pitch independent of the propulsor speed may significantly reduce an actuation rate of and, thus, increase reliability of the pitch adjustment system 42. Since the actuation rate is decreased, a failure of the pitch adjustment system 42 may be more readily detected (e.g., there is more time for detection) since propulsor blade pitch will change relatively slowly under normal operation. Furthermore, in a case of partial or complete hybrid powerplant failure, the propulsor blade pitch may remain substantially constant in, for example, a relatively low drag position. By contrast, a legacy control logic may change the propulsor blade pitch in an effort to increase propulsor speed, which may place the propulsor blades 38 into a relatively high drag position.

Providing a fixed pitch propulsor like control architecture may also provide aircraft speed and glide slope stability. For example, the propulsor speed is closely related to aircraft speed. Relatively small changes in aircraft speed may correspond to relatively large changes in propulsor speed. The control system 24 and its control feedback loop for the electric machine 30 may be configured to automatically compensate for changes in aircraft speed by (A) increasing the electricity provided to the electric machine 30 where there is a drop in the propulsor speed, or (B) decreasing the electricity provided to the electric machine 30 where there is a surge in the propulsor speed. The control system 24 may thereby maintain the aircraft speed and/or the glide slope by dampening the phugoid.

FIG. 6 illustrates a system 114 for an aircraft 116 configured with a plurality of the aircraft propulsion systems 20A and 20B (generally referred to as "20"). Each aircraft propulsion system 20 may include its own propulsor 26A, 26B (generally referred to as "26") and hybrid powerplant 28A, 28B (generally referred to as "28"). The aircraft propulsion systems 20, however, may collectively share a common control system 24. Of course, in other embodiments, each aircraft propulsion system 20 may alternatively its own control system 24, where those control systems 24 may be in signal communication and work with one another. The aircraft system 114 of FIG. 6 includes two of the aircraft propulsion systems 20, where the first aircraft propulsion system 20A is arranged to a first (e.g., left) side of the aircraft 116 and its fuselage 118 and the second aircraft propulsion system 20B is arranged to a second (e.g., right) side of the aircraft 116 and its fuselage 118. Of course, in other embodiments, the aircraft system 114 may include more than two of the aircraft propulsion systems 20.

The aircraft system 114 may be configured for flight-by-power. The control system 24, for example, may selectively control operation of the aircraft propulsion systems 20 in order to adjust one or more aircraft flight parameters such as, but not limited to, pitch, row, yaw and/or altitude. For example, to turn the aircraft 116 towards the first side, the control system 24 may signal the second aircraft propulsion system 20B to increase its thrust output and/or signal the first aircraft propulsion system 20A to decrease its thrust output. Such thrust control may be performed by adjusting (e.g., increasing or decreasing) the propulsor speed setpoint (or propulsor speed range) for one or more or each of the aircraft propulsion systems 20 to adjust the thrust from that/those aircraft propulsion systems 20. This thrust control may be performed in conjunction with or as an alternative to adjusting one or more flight control surfaces; e.g., a rudder 120, an elevator 121, a flap 122, etc. Reducing or eliminating movement of the flight control surface(s) (e.g., 120-122) may reduce aircraft drag during the maneuver and thereby increase aircraft efficiency.

Figures 7, 8:
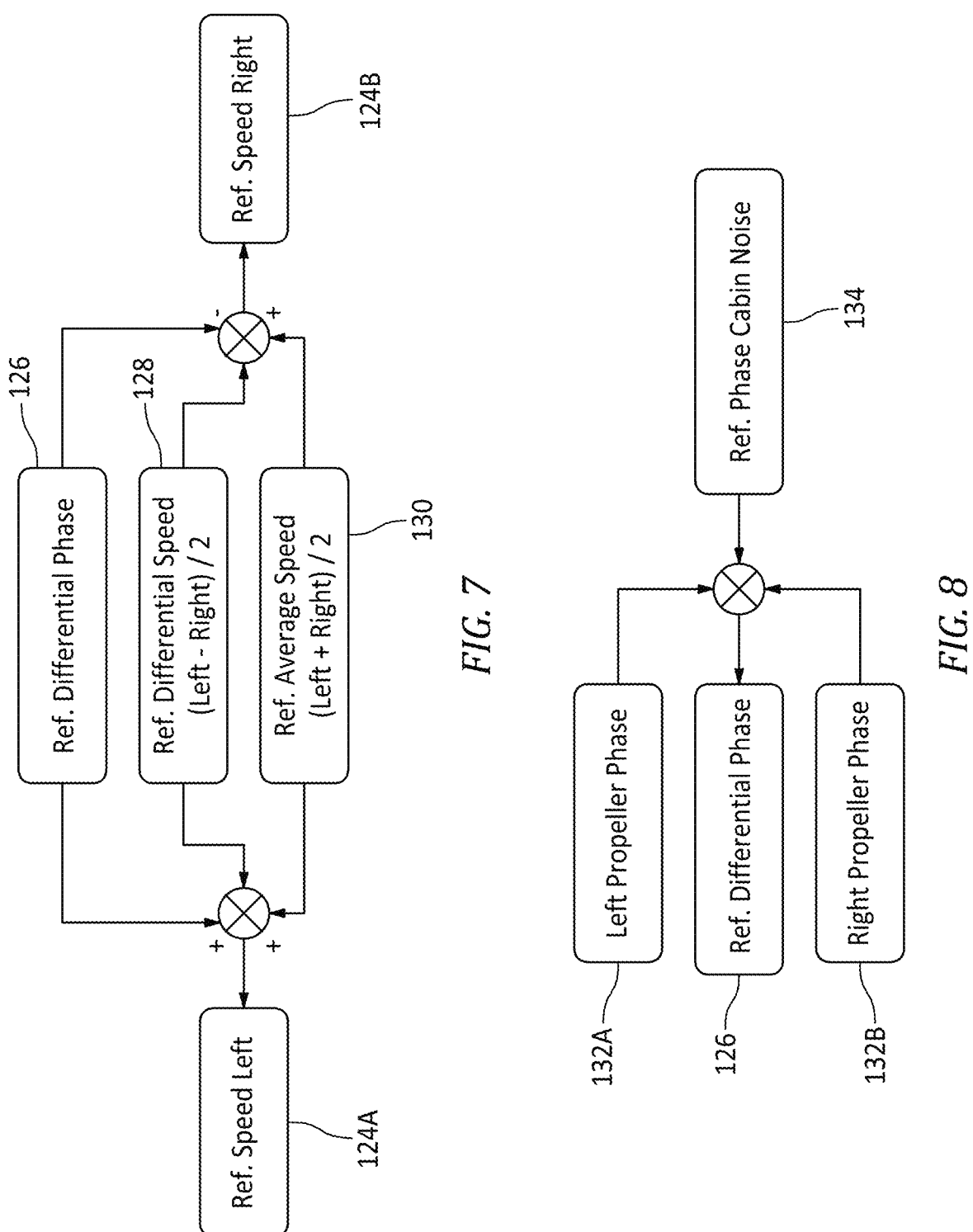
FIG. 7 is an illustration of a control architecture for determining one or more propulsor speed setpoints.
FIG. 8 is an illustration of a control architecture for determining a differential phase parameter.

Referring to FIGS. 6 and 7, the control system 24 may determine the propulsor speed setpoint (e.g., 124A, 124B) (or the propulsor speed range) for each aircraft propulsion system (e.g., 20A, 20B) to facilitate a flight-by-power maneuver based on one or more parameters. Examples of these parameters include, but are not limited to, a differential phase parameter 126, a differential speed parameter 128 between the propulsors 26A and 26B and/or an average speed parameter 130 between the propulsors 26A and 26B.

Referring to FIGS. 6 and 8, the differential phase parameter 126 may be determined based on a phase 132A, 132B (e.g., relative blade location) of each propulsor 26 and a cabin noise parameter 134 related to propulsor phase. The control system 24, for example, may operate the aircraft propulsion systems 20 to synchronize the propulsors 26 in propulsor speed and/or propulsor phase to facilitate noise attenuation; e.g., cancellation. For example, a slight asymmetry may be introduced between the first propulsor phase 132A and the second propulsor phase 132B. This differential phase parameter 126 may be antagonistic with the differential speed parameter 128 such that a compromise may be made between comfort and flight controls.

Figure 9:
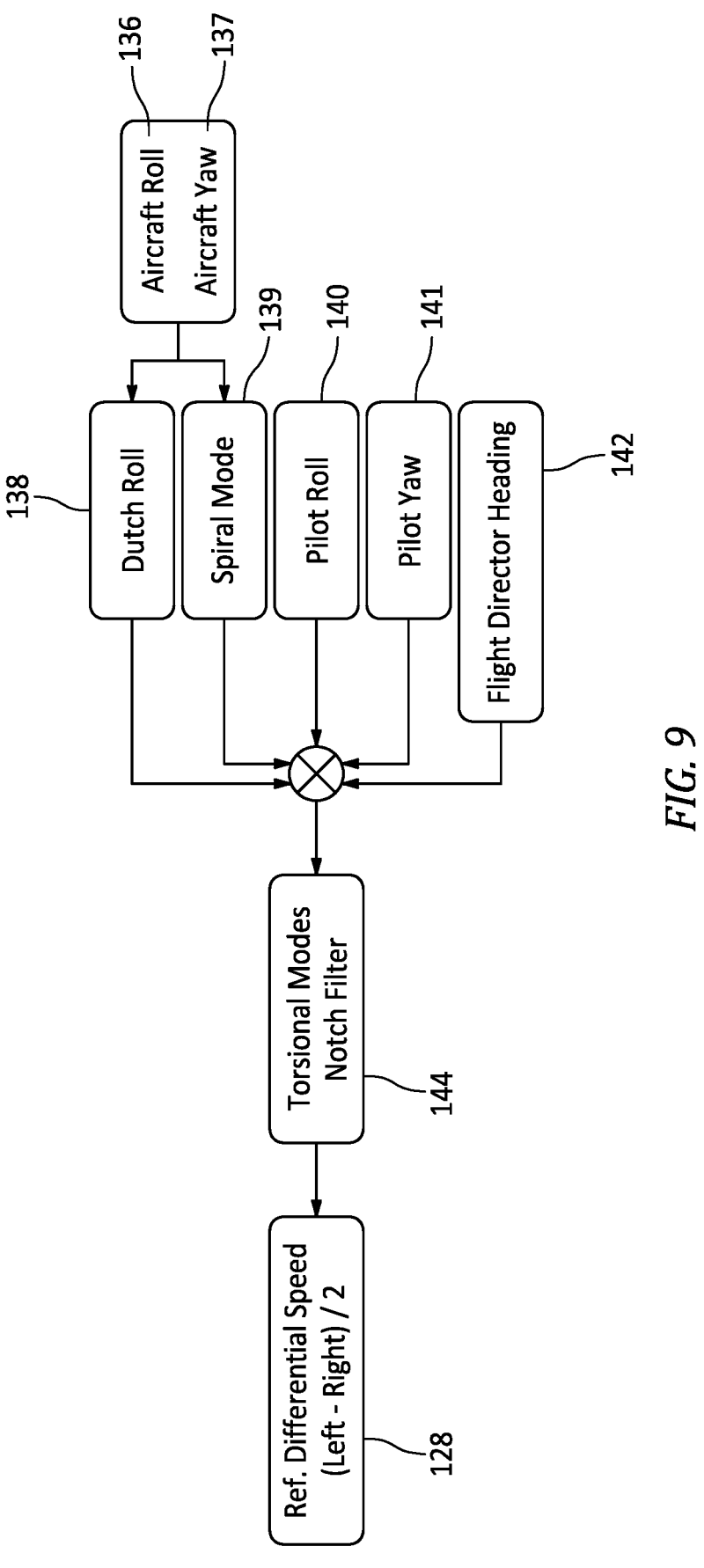
FIG. 9 is an illustration of a control architecture for determining a differential speed parameter.

Referring to FIG. 9, the differential speed parameter 128 may be determined based on one or more flight parameters. Examples of these flight parameters include, but are not limited to, aircraft roll 136, aircraft yaw 137, Dutch roll 138, spiral mode 139, pilot roll 140 (e.g., roll command from the pilot), pilot yaw 141 (e.g., yaw command from the pilot) and/or flight director heading 142. The Dutch roll parameter 138 may be associated with rapid differential thrust pulses to dampen the respective aircraft mode. The spiral mode parameter 139 may be associated with slower thrust pulses to correct divergence of the respective aircraft mode. The pilot roll parameter 140, the pilot yaw parameter 141 and the flight director heading parameter 142 may be associated with random inputs. These parameters 138-142 may be processed to provide an output which is passed through a torsional mode notch filter 144 to reduce (e.g., avoid) torsional oscillations; e.g., the output is filtered to reduce or eliminate frequency components that may excite mechanical transmission torsional modes. An output from the torsional mode notch filter 144 may provide or otherwise be indicative of the differential speed parameter 128.

Figure 10:
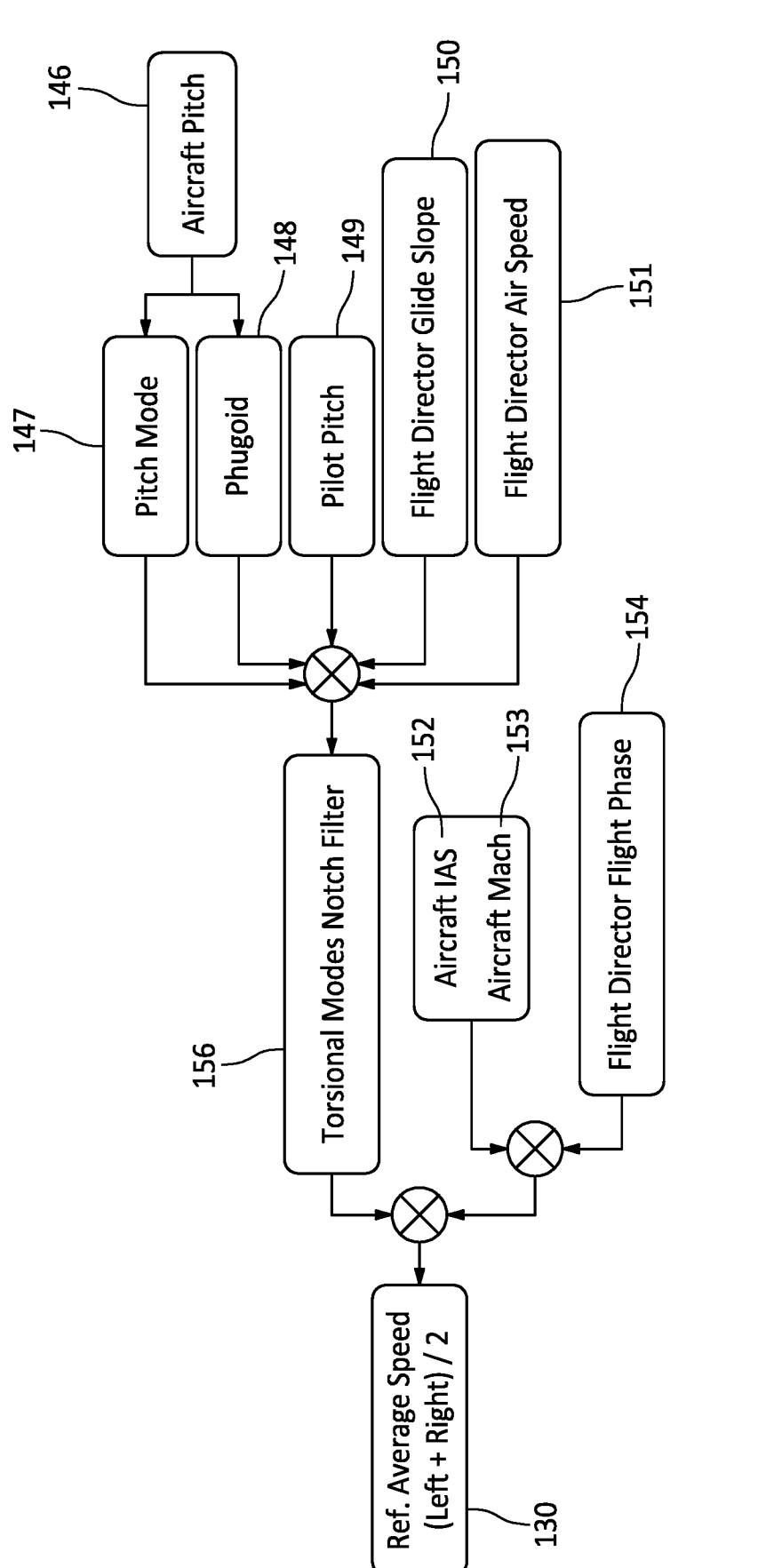
FIG. 10 is an illustration of a control architecture for determining an average speed parameter.

Referring to FIG. 10, the average speed parameter 130 may be determined based on one or more flight parameters. Examples of these flight parameters include, but are not limited to, aircraft pitch 146, pitch mode 147, phugoid 148, pilot pitch 149 (e.g., pitch command from the pilot), fight director glide slope 150, flight director air speed 151, indicated airspeed 152 of the aircraft 116, Mach number 153 of the aircraft 116 and/or flight director flight phase 154. The pitch mode parameter 147 is associated with rapid short thrust pulses to dampen the respective aircraft mode. The phugoid parameter 148 is associated with slower thrust pulses to dampen the respective aircraft mode. The pilot pitch parameter 149 is associated with a random input from the cockpit; e.g., from the pilot. The glide slope parameter 150 targets approach on a constant glide slope; e.g., a combination of pitch and phugoid. The air speed parameter 151 targets a constant air speed in climb, cruise and descent (e.g., approach) and may affect the phugoid. The parameters 147-151 may be processed to provide an output which is passed through another torsional mode notch filter 156 to reduce (e.g., avoid) torsional oscillations; e.g., the output is filtered to reduce or eliminate frequency components that may excite mechanical transmission torsional modes. The parameters 152-154 may be processed to provide an output which is process with the output from the torsional mode notch filter 156 to provide the average speed parameter 130.

The foregoing control system modules/control architectures (e.g., FIGS. 8-10) may facilitate relatively small thrust impulses (overlapped with main thrust) that may stabilize, correct and/or modify aircraft flight, for example, without moving any of the flight control surfaces (e.g., 120-122 of FIG. 6). Of course, in other embodiments, the thrust impulse may be paired with slight movements of one or more of the flight control surfaces (e.g., 120-122 of FIG. 6). Maintaining the flight control surfaces (e.g., 120-122 of FIG. 6) in fixed positions (or slightly moving) can reduce or eliminate parasitic drag generated by vortex shedding when the flight control surfaces (e.g., 120-122 of FIG. 6) modify airflow locally around the respective airfoils.

The flight-by-power methodology may facilitate improved aircraft control during a failure event. The control system 24 of FIG. 6, for example, may switch from operation of multiple aircraft propulsion systems 20 to operation of a single one of the aircraft propulsion systems 20 relatively seamlessly without significantly impacting flight control, both at takeoff and otherwise during flight. The foregoing flight-by-power methodology may also facilitate steeper aircraft approach.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A system for an aircraft, comprising:
a propulsor;
a powerplant configured to output mechanical power to drive rotation of the propulsor, the powerplant comprising a heat engine and an electric machine, the heat engine configured to provide a first portion of the mechanical power, and the electric machine configured to provide a second portion of the mechanical power; and
a control system configured to operate the powerplant to control a rotational speed of the propulsor by adjusting the second portion of the mechanical power,
wherein
the propulsor comprises a plurality of variable pitch propulsor blades;
the rotational speed of the propulsor is controlled by the control system independent of adjustments to a pitch of the plurality of variable pitch propulsor blades;
the pitch of the plurality of variable pitch propulsor blades is adjusted independent of the rotational speed of the propulsor; and
the pitch of the plurality of variable pitch propulsor blades is adjusted based on:
an indicated airspeed of the aircraft;
a true airspeed of the aircraft;
a Mach number of the aircraft;
a thrust request; and
a phase of aircraft flight.

2. The system of claim 1, wherein the second portion of the mechanical power is less than thirty percent of the mechanical power.

3. The system of claim 1, wherein the second portion of the mechanical power is adjusted to drive the rotational speed of the propulsor towards a speed setpoint.

4. The system of claim 1, wherein the second portion of the mechanical power is adjusted to maintain the rotational speed of the propulsor within a range.

5. The system of claim 1, wherein the control system is configured to
determine a rotational speed parameter indicative of a rotational speed of the electric machine; and
signal the powerplant to adjust electrical power provided to the electric machine based on the rotational speed parameter.

6. The system of claim 1, wherein the control system is configured to operate the powerplant to control a torque of the heat engine.

7. The system of claim 1, wherein the control system is configured to
determine a torque parameter indicative of a torque output by the heat engine; and
signal the powerplant to adjust fuel provided to the heat engine based on the torque parameter.

8. The system of claim 1, further comprising:
a first propulsion system comprising the propulsor and the powerplant; and
a second propulsion system comprising a second propulsor;
the control system configured to operate the powerplant to control the rotational speed of the propulsor based on a differential phase parameter associated with the propulsor and the second propulsor.

9. The system of claim 1, further comprising:
a first propulsion system comprising the propulsor and the powerplant; and
a second propulsion system comprising a second propulsor;
the control system configured to operate the powerplant to control the rotational speed of the propulsor based on a differential speed parameter between the propulsor and the second propulsor.

10. The system of claim 1, further comprising:

a first propulsion system comprising the propulsor and the powerplant; and a second propulsion system comprising a second propulsor;

the control system configured to operate the powerplant to control the rotational speed of the propulsor based on an average speed parameter between the propulsor and the second propulsor.

11. The system of claim 1, further comprising:

a first propulsion system comprising the propulsor and the powerplant; and a second propulsion system;

the control system configured to adjust thrust produced by the first propulsion system and thrust produced by the second propulsion system to control a flight parameter of the aircraft.

12. The system of claim 1, wherein the control system comprises a torsional mode notch filter.

13. The system of claim 1, wherein the propulsor comprises a propeller.

14. A method for operating an aircraft system, comprising rotating a propulsor to generate thrust, the propulsor rotated using mechanical power provided concurrently from a heat engine and an electric machine;

operating the electric machine to control a rotational speed of the propulsor; and controlling a pitch of a plurality of blades independent of the rotational speed of the propulsor, the propulsor comprising the plurality of blades, wherein the rotational speed of the propulsor is controlled by the electric machine independent of adjustments to the pitch of the plurality of blades, and wherein the pitch of the plurality of blades is controlled and adjusted based on:

an indicated airspeed of the aircraft system;

a true airspeed of the aircraft system;

a Mach number of the aircraft system;

a thrust request; and a phase of aircraft flight.

* * * * *